(No Model.) 12 Sheets—Sheet 1.

H. O. BALDRY & J. T. PULLON.
EXCAVATOR.

No. 419,401. Patented Jan. 14, 1890.

Witnesses:
J. Thomson Cross
Will. E. Rouzee

Inventors.
Henry Osborne Baldry and
Joseph Thomas Pullon
per Henry Orth
Att'y (No Model.) 12 Sheets—Sheet 2.

H. O. BALDRY & J. T. PULLON.
EXCAVATOR.

No. 419,401. Patented Jan. 14, 1890.

Witnesses:
J. Thomson Cross
Will E. Rouzee

Inventor
Henry Osborne Baldry
and Joseph Thomas Pullon.
per Henry Orth
Att'y.

(No Model.) 12 Sheets—Sheet 3.
H. O. BALDRY & J. T. PULLON.
EXCAVATOR.
No. 419,401. Patented Jan. 14, 1890.
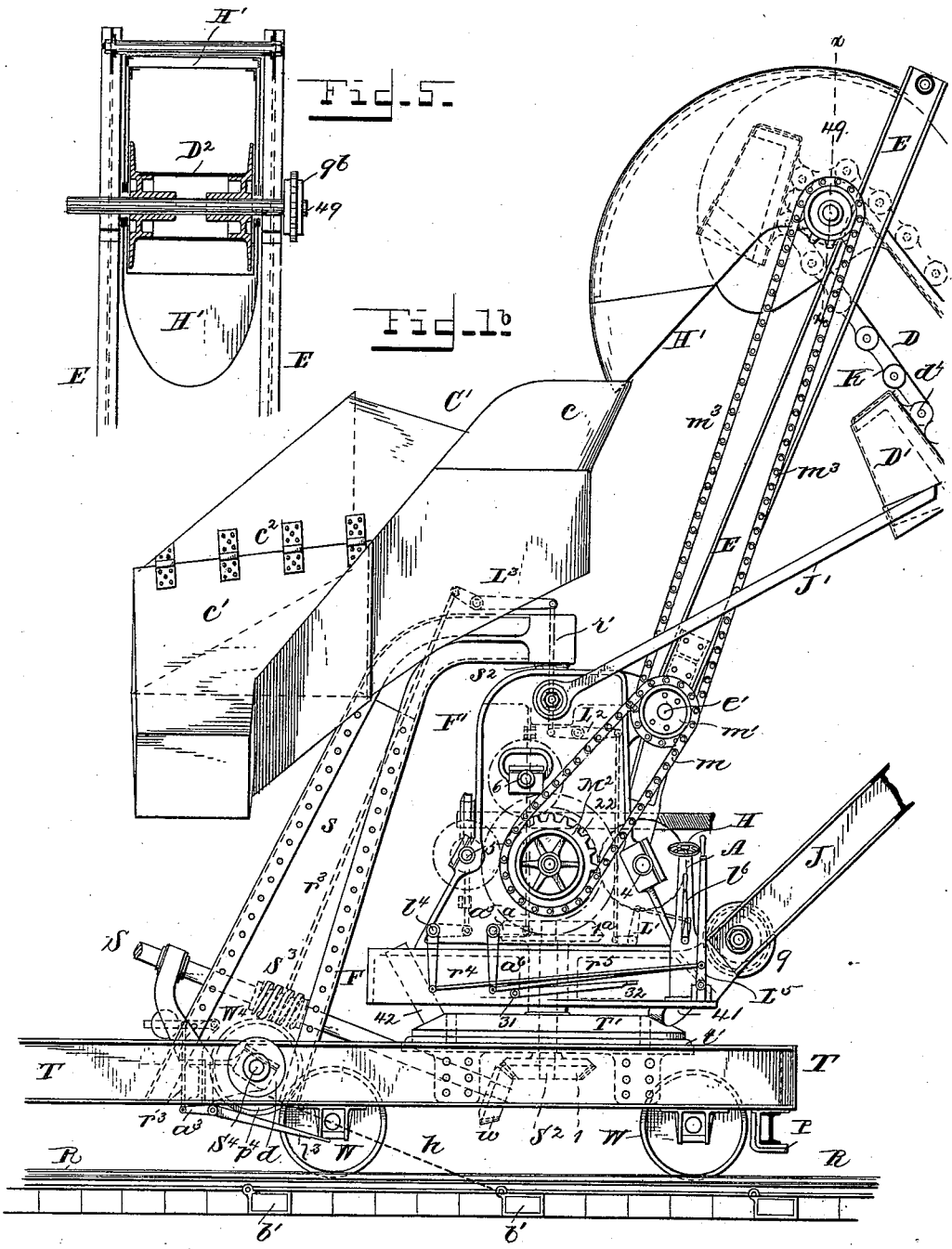
Witnesses:
J. Thomson Cross
Will. E. Rouzee
Inventor
Henry Osborne Baldry and
Joseph Thomas Pullon
per
Henry Orth
Atty.

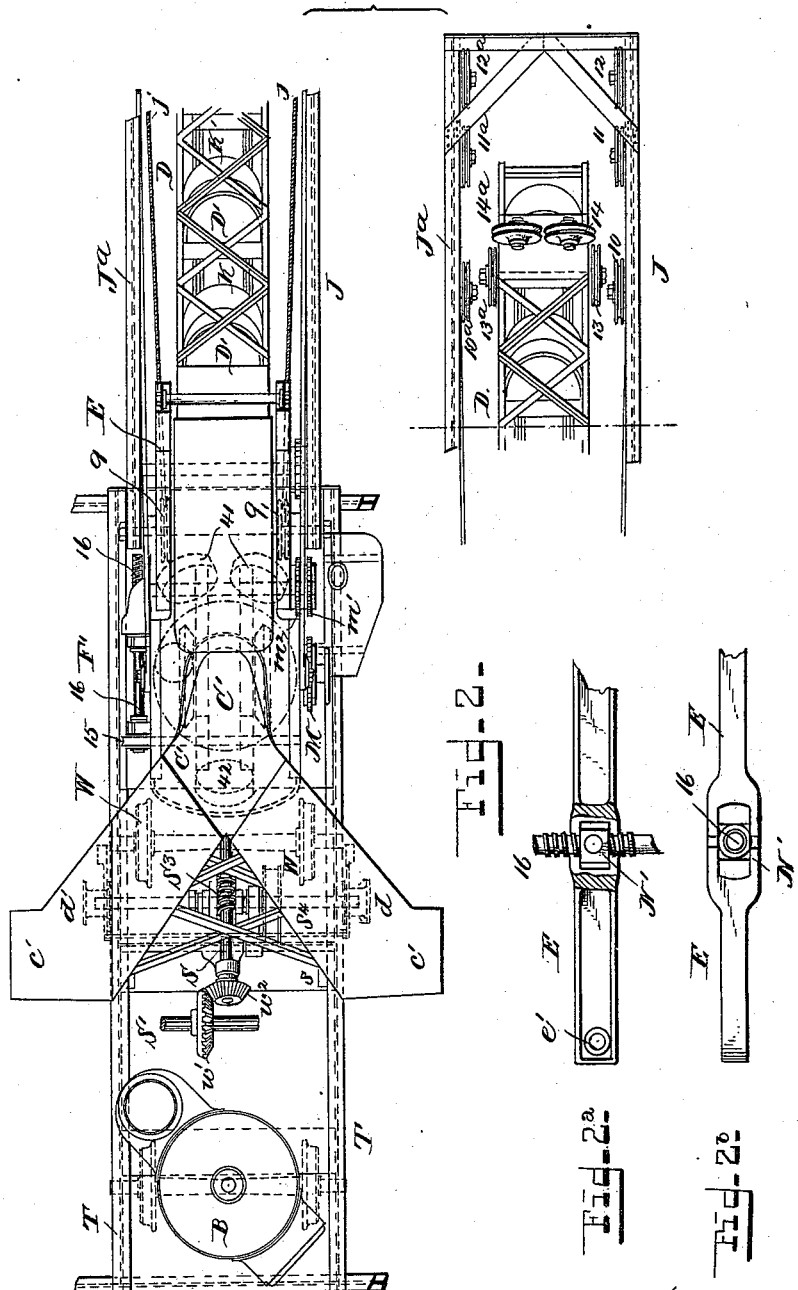

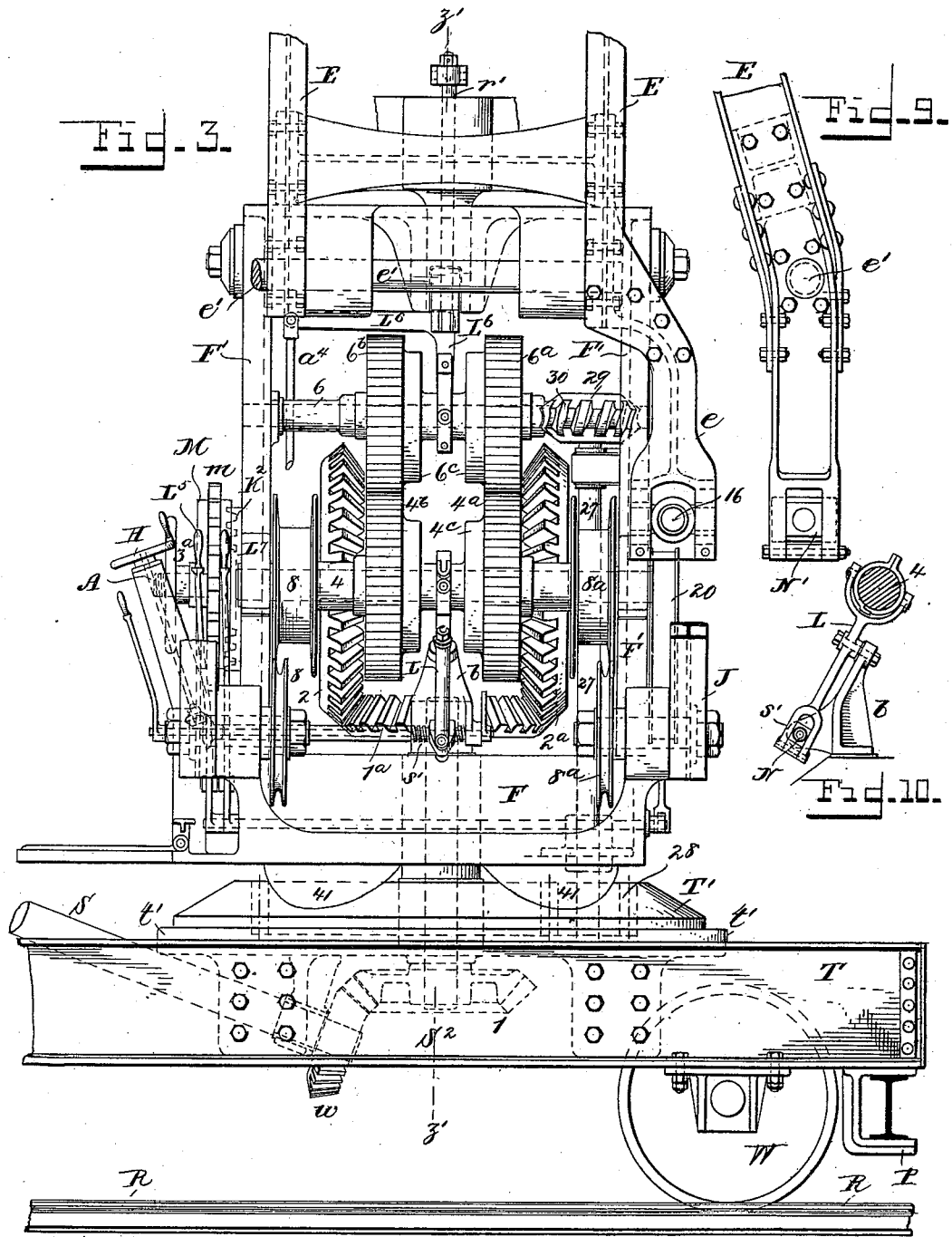

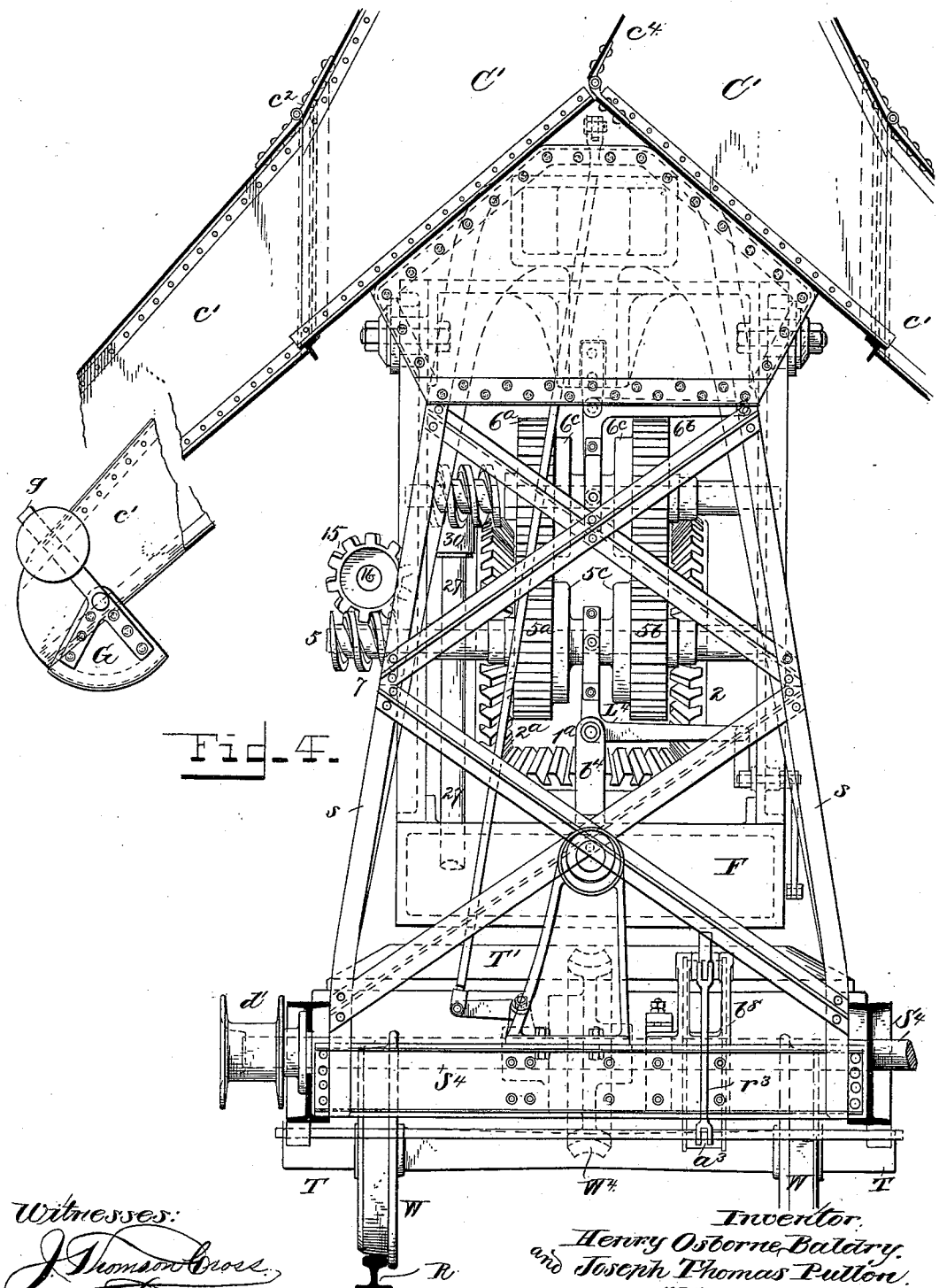

(No Model.) 12 Sheets—Sheet 7.
H. O. BALDRY & J. T. PULLON.
EXCAVATOR.
No. 419,401. Patented Jan. 14, 1890.
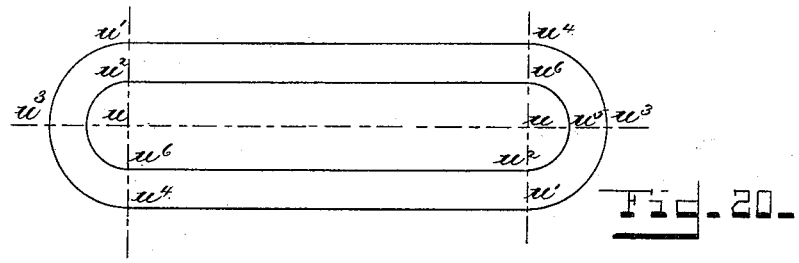
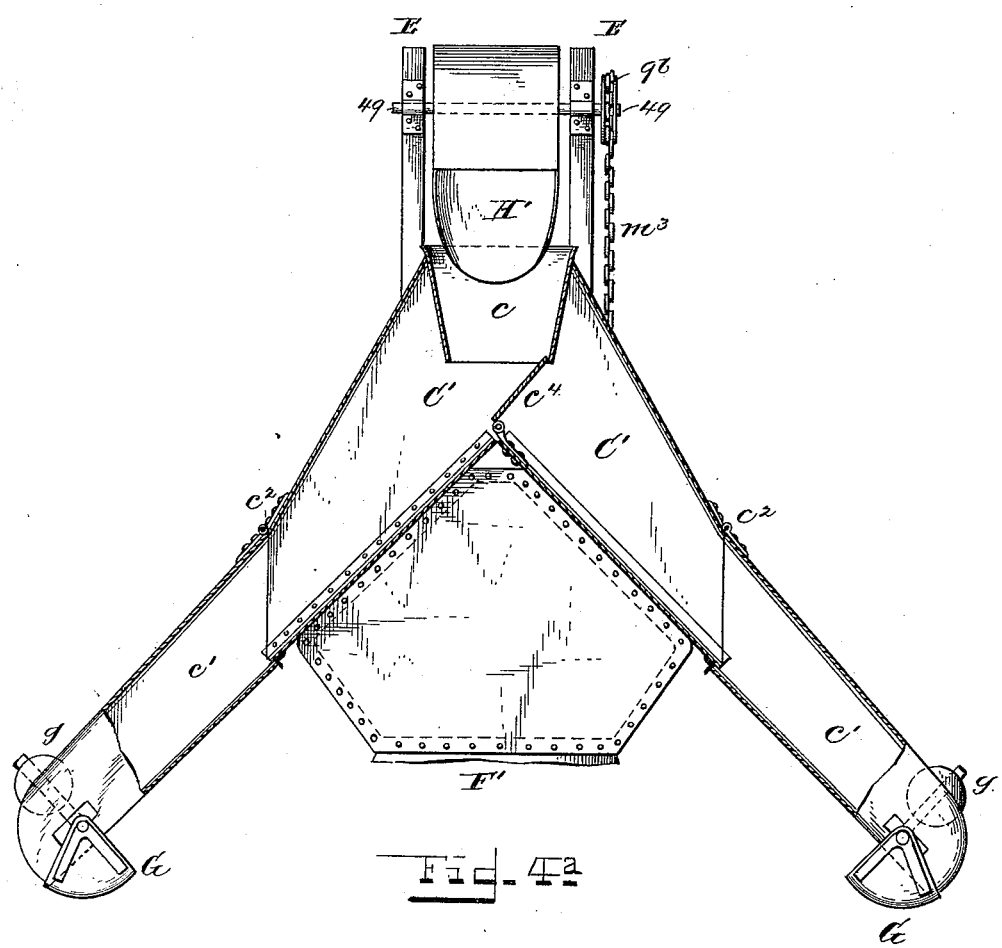

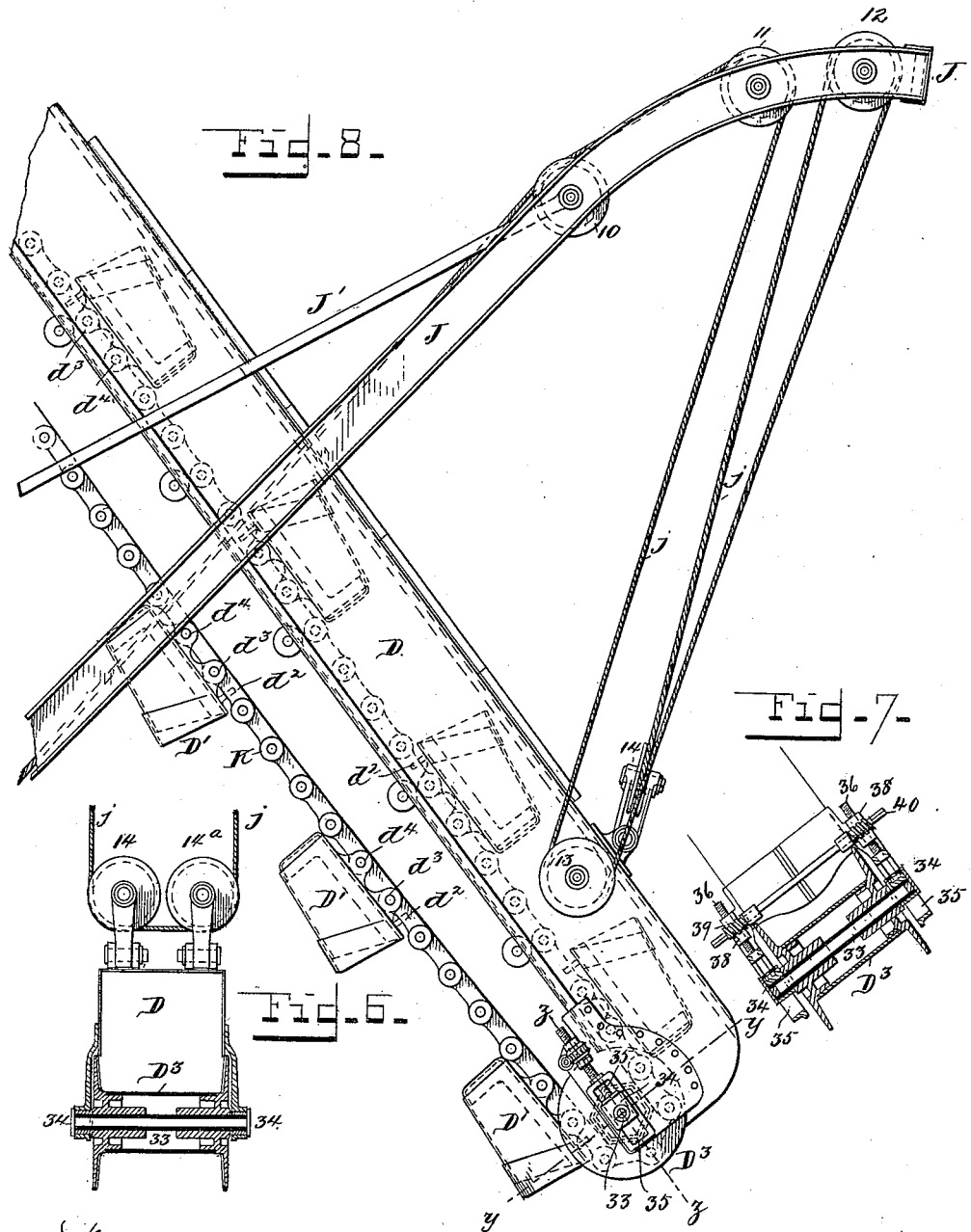

(No Model.) 12 Sheets—Sheet 9.
H. O. BALDRY & J. T. PULLON.
EXCAVATOR.
No. 419,401. Patented Jan. 14, 1890.
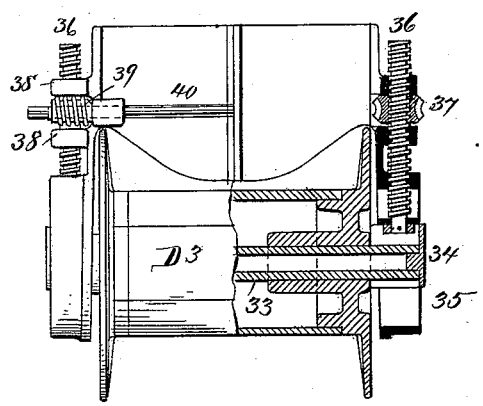
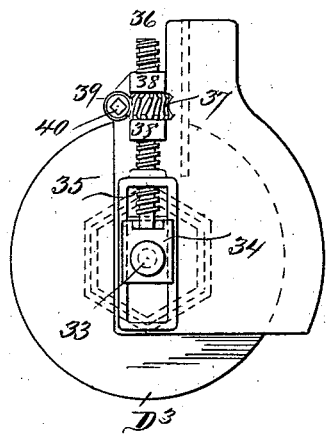
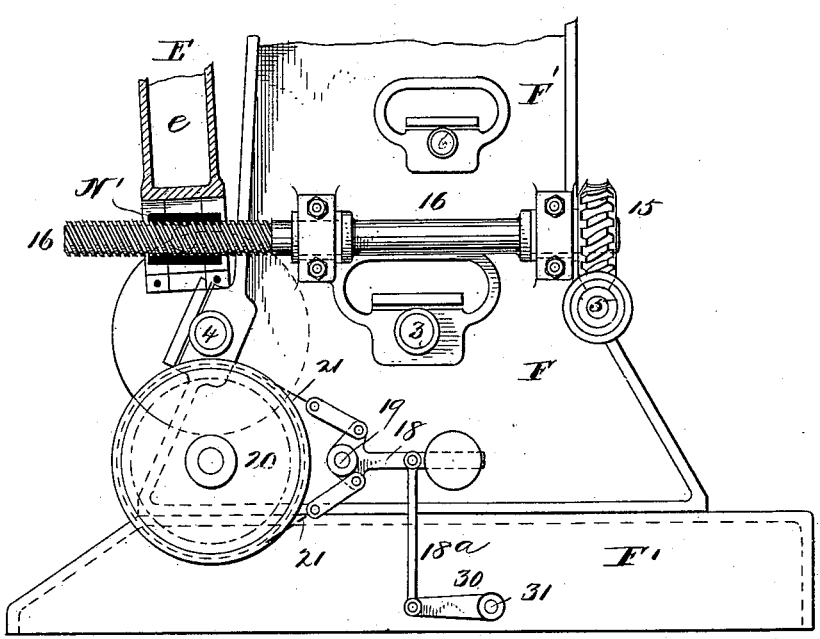

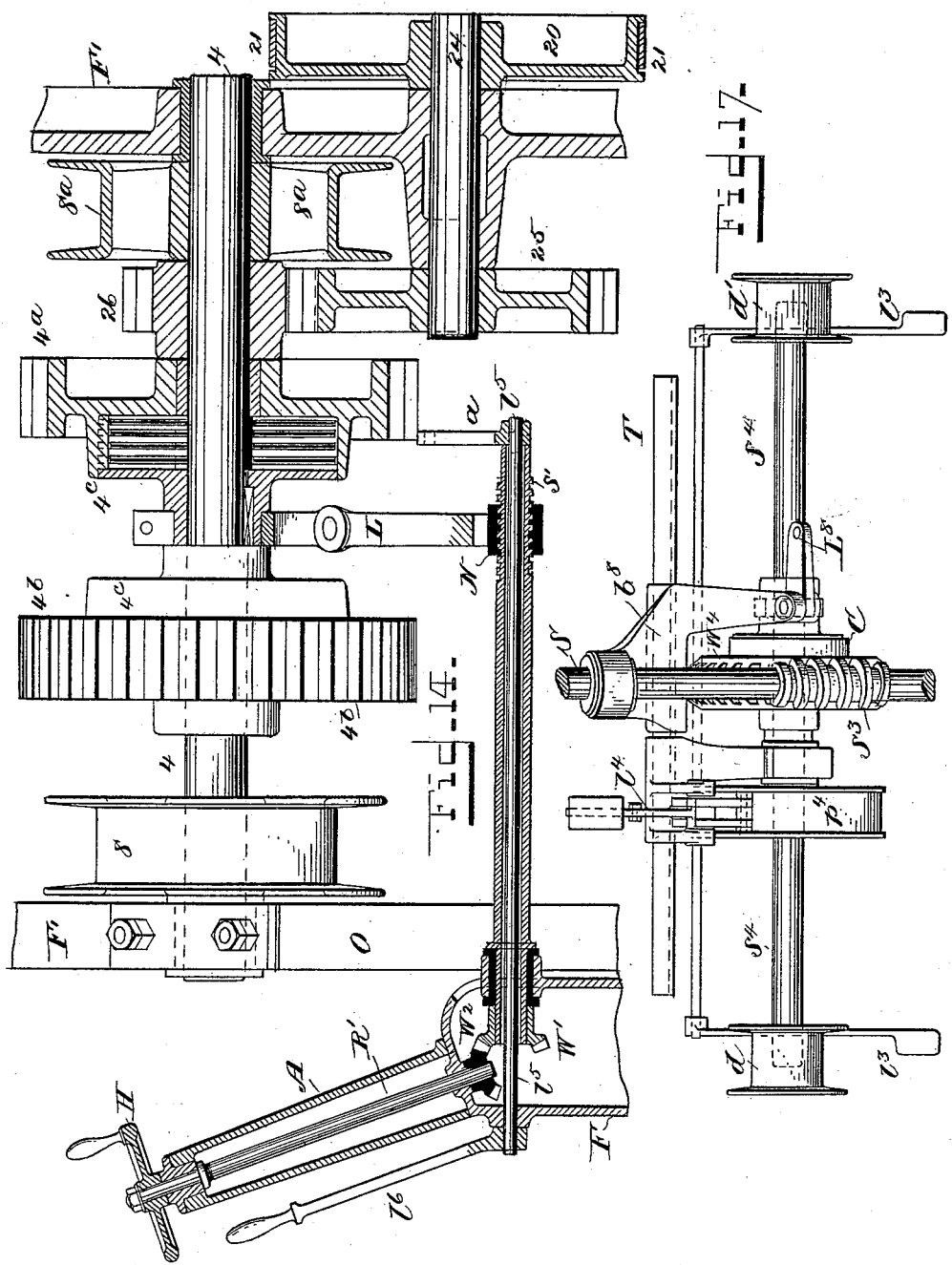

(No Model.) 12 Sheets—Sheet 11.
H. O. BALDRY & J. T. PULLON.
EXCAVATOR.
No. 419,401. Patented Jan. 14, 1890.
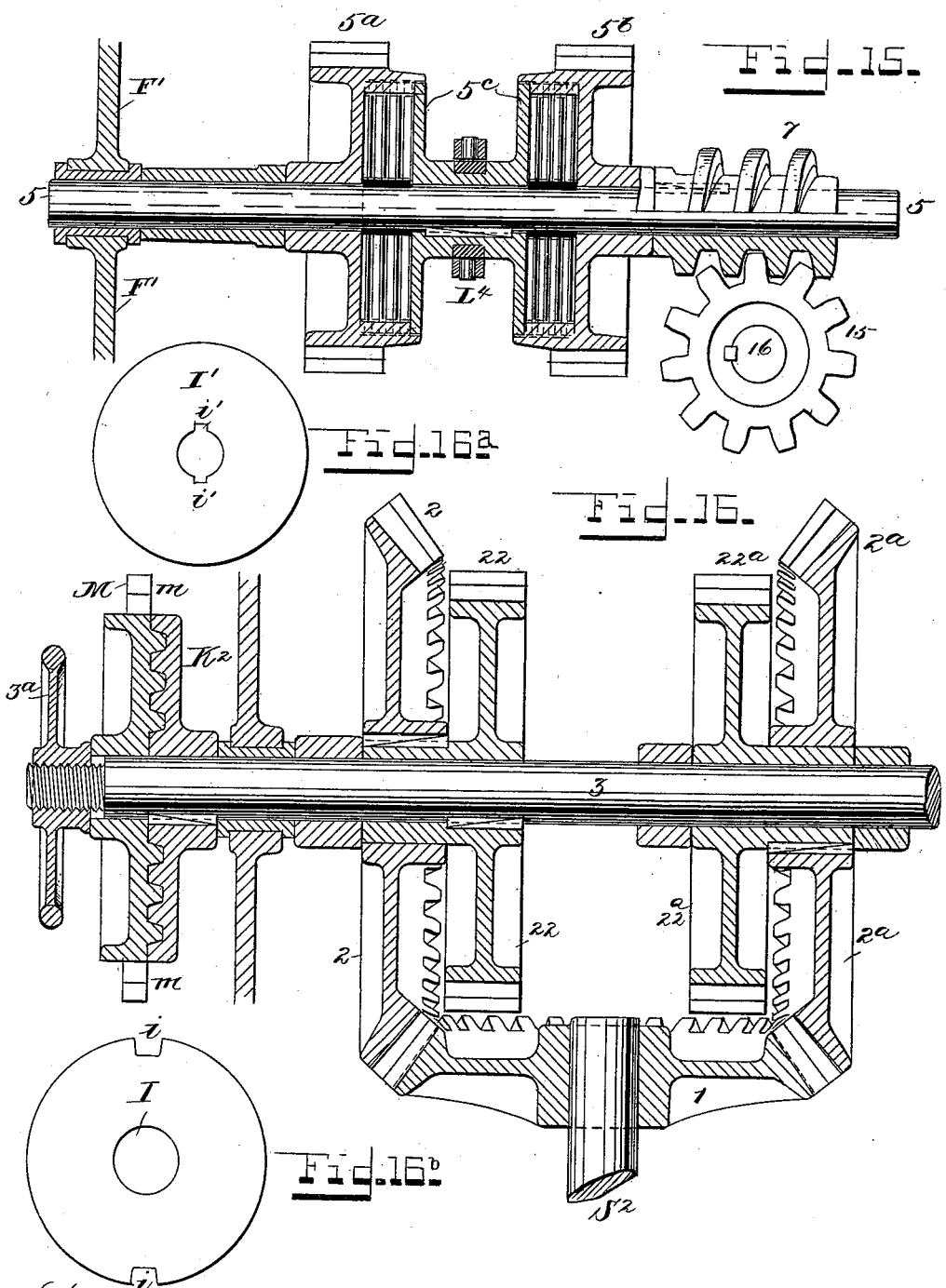

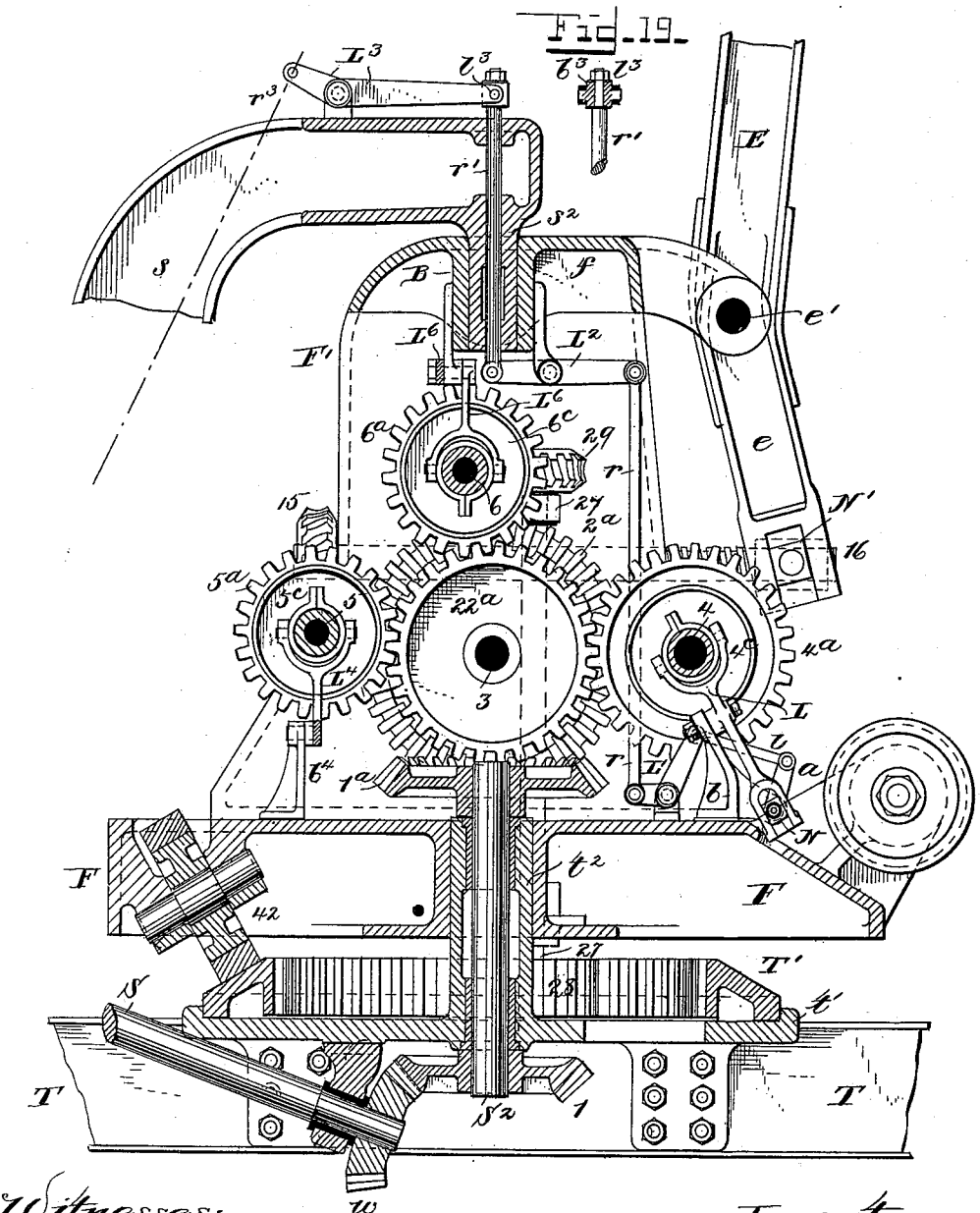

UNITED STATES PATENT OFFICE.

HENRY O. BALDRY, OF WESTMINSTER, COUNTY OF MIDDLESEX, AND JOSEPH T. PULLON, OF LEEDS, COUNTY OF YORK, ENGLAND.

EXCAVATOR.

SPECIFICATION forming part of Letters Patent No. 419,401, dated January 14, 1890.

Application filed June 28, 1888. Serial No. 278,506. (No model.) Patented in England July 9, 1887, No. 9,668.

*To all whom it may concern:*

Be it known that we, HENRY OSBORNE BALDRY and JOSEPH THOMAS PULLON, subjects of the Queen of Great Britain and Ireland, and residents of Westminster, in the county of Middlesex, and Leeds, in the county of York, respectively, have invented certain Improvements in Excavators, (for which we have obtained a British patent, No. 9,668, dated July 9, 1887,) of which the following is a specification.

Figure 1:
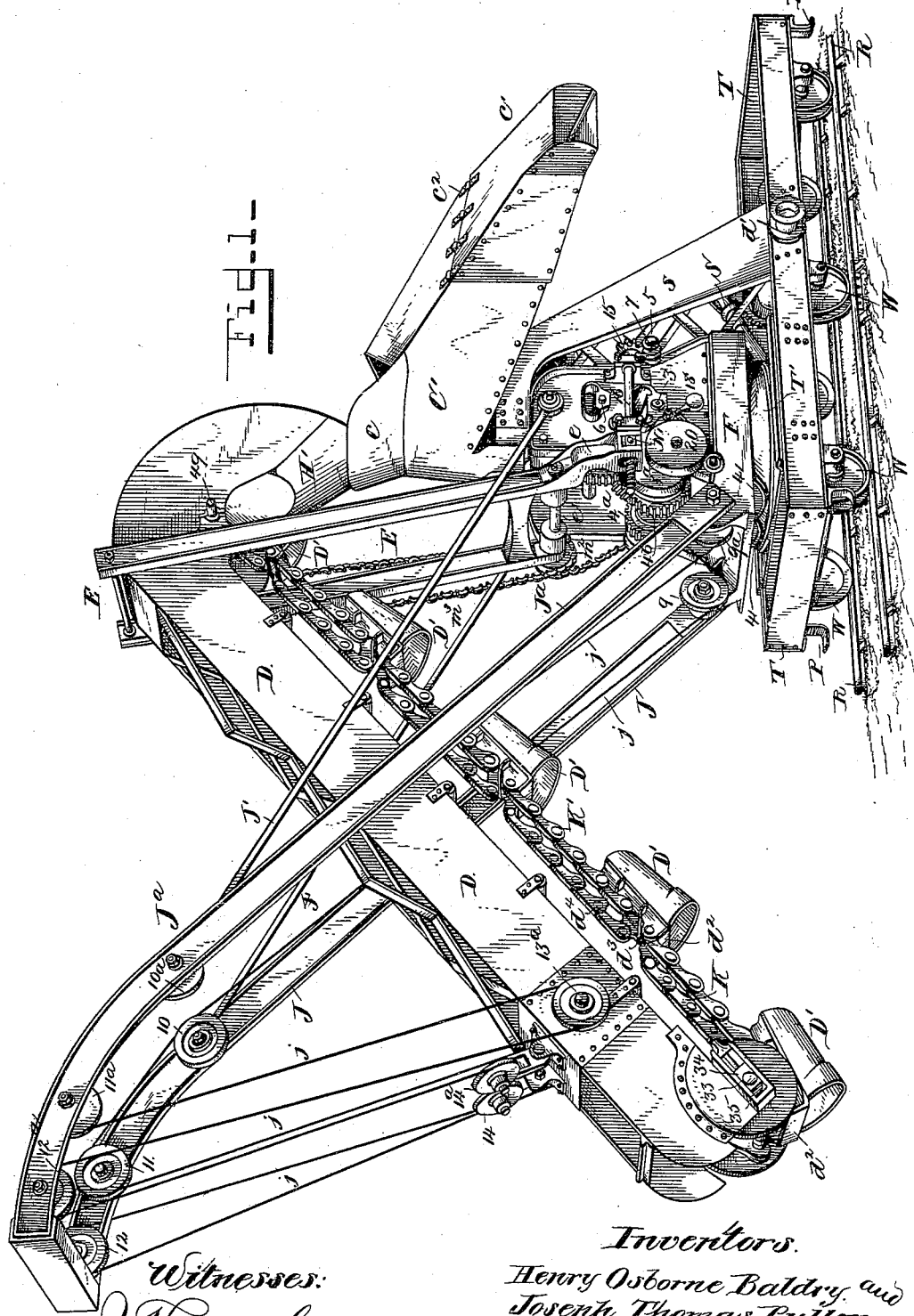
Figure 1A:
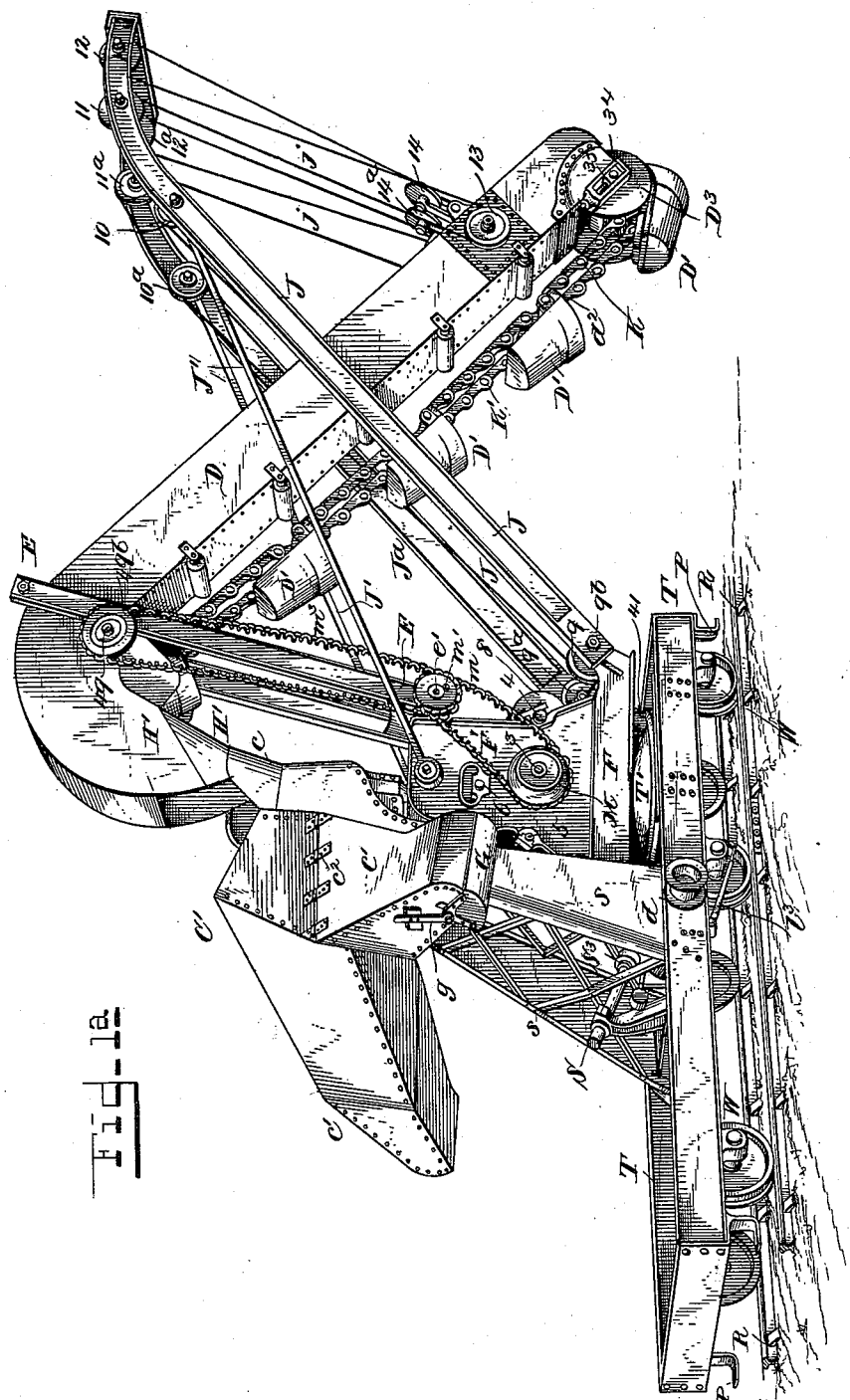

Referring to the accompanying drawings, Figures 1 and 1$^a$ are isometric views of our improved excavator, taken from opposite sides. Fig. 1$^b$ is a side elevation, and Fig. 2 a top plan view thereof, the steam generator and engine being omitted from the figures, except from Fig. 2, in which the upright generator alone is shown, the engine mechanism being omitted. Figs. 2$^a$ and 2$^b$ show a detail sectional side elevation and an edge view of a modified construction of the lower end of the pivoted bucket-trough support or lever. Fig. 3 shows the revoluble frame and mechanism supported therefrom in front elevation, the carriage or truck on which said frame is mounted being shown in side elevation and in a position in which the bucket-trough would project in a direction at right angles to the truck and the track. Fig. 4 is a rear end elevation of the same parts, showing also in part section a portion of the delivery-chute. Fig. 4$^a$ is a sectional view of the upper portion of the revoluble frame, showing the arrangement of the discharge-hopper and the distributing-valve relatively to the discharge-chute. Fig. 5 is a section taken on line $x\, x$ of Fig. 1$^b$. Figs. 6 and 7 are like views taken, respectively, on lines $y\, y$ and $z\, z$ of Fig. 8. Fig. 8 is a side elevation, on a larger scale, of the bucket-trough and part of the jib from which the end thereof is suspended. Fig. 9 is a detail view of the lower end of one of the arms of the pivotal support for the bucket-trough. Fig. 10 is a detail view of one of the clutch-levers. Fig. 11 is a side elevation of a portion of the main frame, showing the mechanism for adjusting the support for the bucket-trough, the lower end of said support being shown in section. Fig. 12 is a half-section and a half-front view of Fig. 7 on an enlarged scale. Fig. 13 is a detail side elevation of the lower end of the bucket-trough, also drawn to an enlarged scale. Fig. 14 is a detail view, partly in section and partly in elevation, on the line of the shaft 4, showing the clutch and part of the brake mechanism. Fig. 15 is a like view on line of shaft 5. Fig. 16 is a section on line of shaft 3, said shaft being shown in elevation, said figures being drawn to an enlarged scale. Figs. 16$^a$ and 16$^b$ are face views of the metallic and wood disks, respectively, employed in the friction-clutches. Fig. 17 is a detail front view of the transmitting-shaft and parts connected therewith, showing the clutch mechanism for the haulage-drums. Fig. 18 is a vertical cross-section of the main frame and mechanism mounted thereon, taken on line $z'\, z'$ of Fig. 3. Fig. 19 is a sectional detail view of the connection between the operating-lever and the connecting-rod of one of the friction-clutches, and Fig. 20 is a diagram of the course of an endless bucket-chain.

The invention relates to that class of excavators in which the work is performed by buckets connected to endless traveling chains, from which buckets the spoils are discharged as said buckets turn around the upper tumbler-shaft.

The invention consists in the combination, with the excavating-buckets, of a revoluble support therefor and a wheeled truck upon which such support is adapted to revolve, and of a stationary discharge-chute for the spoils, having lateral valved branches or ducts and a distributing-valve for directing the spoils to one or the other of said ducts, or to both; in the combination, with the truck and an excavating mechanism, of mechanism for adjusting the bucket-carrier and mechanism for moving the excavator and holding the excavating devices to the work; in the combination, with the excavating mechanism, the mechanism for adjusting the same, and the driving mechanism, of a prime motor-shaft having a continuous motion in one and the same direction, and of mechanism for reversing the motion of the driving and adjusting mechanism either as a whole or independently of each other; in means for avoiding what is commonly termed the "kicking" of the buckets as they turn over the tumblers, and, finally, in structural features and combinations of parts or mechanisms, substantially as hereinafter fully described, and set forth in the claims.

Referring to the drawings, T indicates a truck or carriage mounted on wheels W, and adapted to travel on rails R, as shown in Figs. 1, 1$^a$, 1$^b$, and 3, to which truck are secured two vertically-inclined standards or uprights s, connected at top and braced by lattice or cross braces, from which standards are supported the delivery-chute, hereinafter to be described. At its forward and rear ends the truck T is provided with brackets or pockets P for the reception of the rails R for the track, as shown in Figs. 1, 1$^a$, and 3. Upon the truck is secured a circular track t' for a like race T', that is conical in cross-section and provided with internal gear (see Fig. 18) for revolving the excavator, as hereinafter explained. The truck T is further provided with bearings for a transmitting-shaft S, arranged at an angle to a horizontal, which shaft receives motion in one direction from a prime motor-shaft S', Fig. 2, that also has its bearings on the truck T and is connected in any usual manner with the prime motor. In practice the track or race T' is arranged at the forward end of the truck, and a vertical boiler and engine at the rear end of such truck, the vertical system of boiler and engine being preferred as being more compact.

In Fig. 2 we have shown the boiler B only, having deemed it unnecessary to illustrate the engine and connections between the latter and the prime motor-shaft.

The revoluble supporting-frame is composed of a base F, having an axial opening and a shaft and wheel provided with gear-teeth, and of uprights or cheeks F', connected at top by a cross or crown plate. In the base F are formed bearings for three carrying-wheels 41 and 42, arranged at the points of a triangle, two of said wheels 41 being on that side of the axis of the frame from which the bucket-trough is supported, the third wheel 42 being on the opposite side of the said axis at the apex of the triangle.

The race T' has a tubular bearing $t^2$ projecting axially and upwardly therefrom, in which is mounted a vertical shaft S$^2$, that carries at its foot, below the race T', a bevel-pinion 1, and at its upper end above the base F of the frame a like pinion 1$^a$, (shown in dotted lines in Fig. 3 and in full lines in Fig. 18,) said shaft being driven from inclined transmitting-shaft S through the bevel-pinion w, in gear with pinion 1, the said shaft S$^2$ constituting the main driving-shaft for the excavator. The transmitting-shaft S carries also a bevel-pinion $w^2$, in gear with a like pinion on the prime motor-shaft S'. (See Fig. 2.) The bevel-pinion 1$^a$ on main driving-shaft S$^2$ is in gear with two bevel-pinions 2 and 2$^a$, one of which—namely, the pinion 2$^a$—is loose and the other fast on a central cross-shaft 3, (see Figs. 3, 4, 16, and 18,) this arrangement permitting of the reversal of the motion of the entire driving mechanism, hereinafter to be described, means being also provided for reversing the motion of any set of such driving mechanism, as will hereinafter appear.

To the bevel-pinion 2 is rigidly connected a pinion 22, a like pinion 22$^a$ being connected to bevel-pinion 2$^a$, or said pinions 22 and 22$^a$ may form an integral part of their respective bevel-pinions 2 and 2$^a$. The pinions 22 and 22$^a$ are in gear with like pinions loose on shafts 4, 5, and 6, as hereinafter explained. These shafts are conveniently arranged, one in front, one in rear, and one above the central shaft 3, respectively, as more clearly shown in Fig. 18. The gear-wheel 22$^a$, as shown in the latter figure, is in gear with the pinions 4$^a$, 5$^a$, and 6$^a$, respectively, loose on shafts 4, 5, and 6, while the pinion 22 is in gear with pinions 4$^b$, 5$^b$, and 6$^b$, respectively, loose on said shafts 4, 5, and 6.

Each of the loose pinions on shafts 4, 5, and 6 is provided with a friction-clutch, those for pinions 4$^a$ and 4$^b$ on shaft 4 being indicated by 4$^c$, those for the pinions 5$^a$ and 5$^b$ on shaft 5 by 5$^c$, and those for the pinions 6$^a$ and 6$^b$ on shaft 6 by 6$^c$. (See Figs. 3, 4, 14, 15, and 18.) The friction-clutches 4$^c$ for the pulleys 4$^a$ and 4$^b$ on shaft 4 are operated by the intermediate shifting-lever L, that is fulcrumed on a bracket or stand b, secured to the base F of the frame. The outer end of the lever L is forked and in the fork thereof is journaled a nut N, in which works the screw-threaded end of a tubular shifting-rod s', that carries at its outer end a bevel-pinion W', in gear with a like pinion W$^2$ at the foot of an operating-rod R', that has its bearings in a hollow standard A, projecting from the base F of the frame. It is obvious that by rotating the rod through the medium of its hand-wheel H in one or the other direction one or the other pinion 4$^a$ or 4$^b$ will be locked to the shaft 4, thus providing means for reversing the motion of shaft 4. This mechanism is more plainly shown in Figs. 14 and 18. The friction-clutches 5$^c$ for the pinions 5$^a$ and 5$^b$ on shaft 5 are operated by a lever L$^4$, fulcrumed on a bracket $b^4$, secured to the base F of the frame, said lever being connected to a bell-crank lever $l^4$, (or to one of two radial arms on a rock-shaft,) said bell-crank lever $l^4$ being connected by rod $r^4$ to a hand-lever L$^5$, (see Figs. 1$^b$ and 3,) also providing means for reversing the motion of shaft 5 independently of the reversing mechanism of shaft 4. A lever L$^7$ by the side of lever L$^5$ is connected by a rod $r^5$ to a radial arm $a^6$ on a rock-shaft that carries a second radial arm $a^5$ at right angles to arm $a^6$, forming practically a bell-crank lever. The arm $a^5$ of said rock-shaft is connected by a rod $a^4$ to the clutch-lever L$^6$ for the clutches 6$^c$ of pinions 6$^a$ and 6$^b$ on shaft 6, thus providing means for reversing the motion of shaft 6 independently of the reversing mechanism of shafts 4 and 5. These clutch-connections are more plainly shown in Figs. 1$^b$, 3, 4, and 18.

As shown in Figs. 1$^b$ and 17, the transmitting-shaft S carries a worm S$^3$, adapted to gear with a worm-wheel W$^4$ on a cross-shaft S$^4$, mounted in bearings on the truck T. The shaft S$^4$ has at each end outside of the truck a haulage-drum, (indicated by $d$ and $d'$, respectively,) to each of which is wound a haulage rope or chain $h$, (shown in dotted lines in Fig. 1$^b$,) one end of said rope being attached to a lug or ear on a bracket $b'$, secured to the track, as shown in said Fig. 1$^b$.

The worm-wheel W$^4$ is loose on a shaft S$^4$, and is locked thereto by a friction-clutch, as follows: The clutch-lever L$^8$ is fulcrumed on a bracket $b^8$ on the truck T, (see Fig. 17,) and is operated by a lever $l^6$, Figs. 1$^b$, 3, and 14, secured to a rod $l^5$, that extends through the hollow operating-rod $s'$, that operates the clutches 4$^c$ of pinions 4$^a$ and 4$^b$ on shaft 4, previously described. The outer end of the rod $l^5$ carries a radial arm $a$, connected by link $l$ to one arm of an angle-lever L', whose other arm is connected by a vertical rod $r$ to one arm of a lever L$^2$, fulcrumed on a bracket secured to a tubular bearing B, cast with and depending from the top or crown plate $f$ of the frame F F', said bearing B receiving the perforated journal $s^2$, formed on the standards $s$, that support the delivery-chute, and which journal $s^2$ forms the upper pivot for the frame F F', the lower pivot being formed by the axial bearing $t^2$, hereinbefore described. The other arm of lever L$^2$ is connected by a rod $r'$ to one arm of an angle-lever L$^3$, fulcrumed on a bracket on top of the frame, said rod $r'$ being revoluble in its bearing $b^3$, to which the forked end of lever L$^3$ is connected, said bearing being provided with suitable journals, some such connection being necessary in order to permit the clutch-connections to revolve with the frame. These connections are more clearly shown in Figs. 18 and 19. To the other arm of the angle-lever L$^3$ is connected one end of a rod $r^3$, whose other end is connected with the clutch-lever L$^8$, that operates the clutch C on shaft S$^4$, the object of these various clutch-connections being to bring all of the hand-levers within easy reach of the attendant.

By means of the described shaft S, cross-shaft S$^4$, and driving mechanism the truck T and parts supported therefrom can be moved up to the work as the excavation progresses.

To prevent any sudden forward motion of the truck T when the driving-gear W$^4$ S$^3$ is brought into engagement and to prevent any damage to the excavating devices in case an unusual obstruction is encountered, we provide a friction or differential brake for the shaft S$^4$, which carries a brake-pulley $p^4$, the strap of which is attached to a weighted lever $l^4$, fulcrumed on a bracket secured to the truck and connected by a rod $r^3$ with a radial arm $a^3$ on a rock-shaft $s^3$, that has its bearings on the under side of the truck and carries two foot-levers $l^3$ for rocking the shaft and lifting the brake-lever $l^4$, for purposes well understood, the said foot-levers being on the outside of the truck on opposite sides, so that the attendant may operate the brake-lever from either side of said truck. Should the excavating devices meet with such resistance as to result in damage thereto, the friction-brake will exert sufficient power to overcome the frictional contact of the clutch C, that serves to lock the driving-wheel W$^4$ to said shaft, thus causing the shaft to turn idly and stop the feed motion of the truck.

The excavator is rotated on the race T' by means of a vertical shaft 27, (see Figs. 3 and 18,) that carries at its lower end a pinion 28, in gear with the internal teeth of base F, and at its upper end a worm-wheel 29, that gears with a worm 30 on the upper cross-shaft 6.

As a means for delivering the spoils on either side of the truck we provide a delivery-chute C', that has two ducts $c'$, extending in opposite directions from the main body, which chute is supported by the standards $s$, as hereinbefore stated, and as best shown in Figs. 1 and 1$^a$. The discharge-mouth of the lateral ducts $c'$ of the chute C' is preferably provided with a revoluble gate G, on the pivot of which is secured a weighted lever $g$, to hold said gate either open or closed, as more plainly shown in Figs. 1$^a$, 4, and 4$^a$. The receiving end $c$ of the chute C' is semi-cylindrical for the reception of the correspondingly-shaped discharge end of the receiving-hopper H', which forms the upper terminal of the bucket-trough, so as to permit the trough to revolve with the frame without breaking the connection with the chute, in the upper end of which is arranged a distributing-valve $c^4$. (See Fig. 4; also Fig. 4$^a$, in which latter figure said valve is shown in part to direct the spoils to either of the lateral ducts $c'$ or to both ducts.) The hopper H' is loosely mounted on the top tumbler-shaft 49, as more plainly shown in Fig. 5, so as to allow the bucket-trough D to swing on said shaft without thereby affecting the position of the hopper H' relatively to the receiving end of the discharge-chute C', said hopper being of such length as to always project into the receiving end or hopper $c$ of the chute to whatever position the bucket-trough may or can be adjusted.

To facilitate the transportation of the excavator, the lateral ducts $c'$ of the chute C' are hinged to the main body, as shown at $c^2$, Figs. 1, 1$^a$, and 1$^b$, so that they may be turned up out of the way.

The bucket-trough D is supported from a two-armed yoke-lever E, fulcrumed on a cross-shaft $e'$, that has its bearings in suitable brackets projecting forwardly from the cheeks or sides F' of the frame. The end of the arm $e$ of lever E is slotted or forked, and in said fork is journaled a nut N', in which works the screw-threaded end of a shaft 16, the other end of which shaft 16 carries a worm-wheel 15, that gears with a like wheel or a worm 7 on rear cross-shaft 5. (See more particularly Fig. 11; also Figs. 1$^b$, 15, and 18.)

By means of the mechanism just described the bucket-trough and endless bucket-chain can be moved to or from the working-face being cut by the buckets, thereby avoiding the backing of the truck in case the friction-brake were rendered ineffective when an unusual obstruction to the work of the buckets is encountered.

The lower end of the bucket-trough is adjusted by means presently to be described. Instead of the nut N' and screw-shaft 16 for adjusting the lever E, a toothed sector may be mounted on the cross-shaft $e'$ and operated from shaft 16 by means of suitable intermediate gearing, and instead of a two-armed lever a one-armed lever may be employed, which lever may be pivoted on a fixed pivot secured to the frame, the lever being provided with a threaded nut N', journaled in vertical slots formed in said lever for the threaded end of shaft 16, as shown in Figs. 2$^a$ and 2$^b$. The top tubular shaft 49 has its bearings in the arms or yoke of the lever E, and said shaft serves as a pivot on which the bucket-trough can turn when the lower end thereof is adjusted vertically. The lower end of the bucket-trough D is supported from a jib that is pivotally connected with the frame near its lower end, and is composed of two arms J and J$^a$, extending over the opposite sides of the trough, said jib-arms being braced by means of brace-rods J', pivotally connected with said arms and with the frame of the excavator, as shown. On each pivot-pin 9$^b$, at the lower or frame end of the jib-arms J J$^a$, is mounted a guide-pulley 9 and 9$^a$ for the wire rope or cable $j$, like pulleys 10 10$^a$, 11 11$^a$, and 12 12$^a$, being arranged in the order named on the jib-arms J J$^a$, respectively. On the front cross-shaft 4 are keyed two drums 8$^a$ and 8 outside of the pinions 4$^a$ and 4$^b$, respectively, to which are attached the ends of the wire rope or cable $j$, by means of which the lower end of the bucket-trough is adjusted. The wire rope or cable $j$ is preferably an endless rope, whose ends are secured to the drums 8 and 8$^a$, respectively, the rope running from drum 8 under pulley 9, thence over pulleys 10 11 to and around a pulley 13 on the side of bucket-trough D, and thence around pulley 12. From the latter pulley the rope $j$ passes under two pulleys 14 14$^a$, mounted transversely on the upper side of the bucket-trough D, thence over pulley 12$^a$ on jib-arm J$^a$, around pulley 13$^a$ on opposite side of trough D, to and over pulleys 11$^a$ 10$^a$, under pulley 9$^a$ on said jib-arm J$^a$, to drum 8$^a$. By the use of a single rope, instead of two a uniform pull on both sides is insured.

It is often desirable to lower the bucket-trough more rapidly than the hoisting, and at the same time, to avoid any risk of the bucket-trough falling away accidentally, we employ a friction-brake, (more plainly shown in Figs. 11 and 14,) which brake is constructed substantially like the brake described in reference to the haulage-drums $d$ $d'$, and consists of a weighted brake-lever 18, pivoted at 19 to the frame side F', and a brake-wheel 20, the ends of whose brake-strap 21 are connected to links 23, the relative arrangement being such that the pull on one side of the brake-wheel is greater than on the other, thus providing a differential brake. On the short shaft 24 of the brake-wheel is mounted a gear-wheel 25, that gears with a pinion 26 on front cross-shaft 4 on one side of drum 8$^a$. (See Fig. 14.) The brake-lever 18 is connected by rod 18$^a$ to a radial arm 30 on one end of a cross-shaft 31, to the opposite end of which shaft is secured a foot-lever 32, (see also Fig. 1$^b$,) by means of which the brake-lever is operated, this arrangement bringing the foot-lever 32 also in proximity to all the hand-levers hereinbefore described and within easy reach of the attendant.

The friction-clutches may be of any desired construction. We prefer, however, to employ metallic and wooden disks arranged alternately in a suitable recess or housing formed on the pinions, as shown in Figs. 14, 15, 16, 16$^a$, and 16$^b$, said disks being locked against rotation and alternately to the pinion and shaft.

The wooden disks I have peripheral notches or keyways $i$, fitting onto an internal peripheral key or rib formed in the recess or housing for the disk, while the metal disks I' have like recesses $i'$, formed in the periphery of their axial opening, through which the shaft passes, and fitting over a key or rib on said shaft, the axial opening in the wooden disks I being of such diameter as to clear the key-rib on the shaft.

The central or main cross-shaft 3 carries a friction-clutch K$^2$, which is here shown as composed of a corrugated or ribbed disk rigidly secured to the shaft and adapted to engage a correspondingly-corrugated face of the chain-wheel M, (see Fig. 16,) the clutch being operated by a hand-wheel 3$^a$, whose interiorly-threaded hub works on the outer threaded portion of shaft 3.

The chain-wheel M is connected by a driving-chain $m$ to a chain-wheel $m'$, loose on shaft $e'$, that serves as a fulcrum for the yoke-lever E, from which the bucket-trough is supported. The said shaft carries a second loose chain-wheel $m^2$, that is connected by a driving-chain $m^3$ with a similar wheel 49$^b$ on the upper tumbler-shaft 49. The two chain-wheels $m'$ $m^2$ on shaft $e'$ are locked together by shearing-bolts—a means well known and which we have deemed unnecessary to show—so as that the said bolts may give way or be shorn off when the buckets meet with an unusually great obstruction, thus providing an additional safeguard against breakage. There is, however, still another advantage in loosely mounting the chain-wheels $m'$ $m^2$ on shaft $e'$—namely, the necessity of revolving the shaft in its bearings and in the bearings of lever E is thereby avoided, all the parts carried by said shaft being loosely mounted thereon.

The excavating-buckets D' are secured by lugs at or near the forward end and center of said buckets to two endless chains K K', traveling over a chain-pulley or top tumbler $D^2$ on shaft 49 (see Fig. 5) and over a chain-pulley or bottom tumbler $D^3$. This latter pulley or tumbler, as shown in Figs. 6, 7, 12, and 13, is mounted on a hollow shaft 33, that has its bearings in blocks 34, that are adjustable vertically in slots 35, formed in the sides of the lower end or mouth of the bucket-trough D, by means of screw-rods 36, working in threaded bearings at the upper ends of the slots and in a worm-wheel 37, whose axial opening, through which the shaft passes, is screw-threaded, said wheel being held against vertical motion by two abutments 38.

As a means to take up the slack in the endless propeller-chains K K' the screw-rods 36 are operated by a worm 39 on a cross-shaft 40, whose outer end is squared for the application of a key or crank, as shown.

To prevent any accumulation of spoils at the bottom of the bucket-trough D, each excavating-bucket is provided at its forward end or mouth with a downwardly-projecting lip $d^2$, that scrapes the material and carries it along the bucket-trough into the discharge-hopper H'.

It is well known that when buckets are carried by an endless chain over a polygonal tumbler they will, as is technically termed, "kick," by reason of the instantaneous acceleration in speed as they travel over the tumblers—that is to say, so long as the buckets are traveling along lines parallel to line $u\ u$, Fig. 20, their velocity will be equal to that of the chain to which they are attached; but as soon as they pass beyond the points $u'$ and $u'$ their velocity is instantaneously increased in the ratio of the distances between $u\ u^2$ and $u\ u'$, since the center line of the buckets must traverse the distances $u'\ u^3\ u^4$ within the same period of time that the chain-links traverse the distance $u^2\ u^5\ u^6$, which distances are in the ratio of the radii $u'\ u'$ and $u\ u^2$, the reverse being the case when the centers of the buckets pass the points $u^4\ u^4$. Since the distance from the center line of the buckets to the center line of the link-pins—that is to say, the distance from $u'$ to $u^2$—is constant, and the radius $u\ u^2$ is less for a pentagonal than for a hexagonal tumbler, the ratio of $u\ u'$ to $u\ u^2$ is greater with a pentagonal than with a hexagonal tumbler. Consequently, for a given speed of the chain, the augmentation of velocity is greater with a pentagonal tumbler than with a hexagonal one. For this reason we preferably employ a hexagonal tumbler, and to further equalize the speed of the buckets at the turning-point we provide such buckets with two eye-pieces $d^3\ d^4$, forming one link of the chain, one of said eye-pieces $d^3$ being located near the forward end and the other $d^4$ about the center of the bucket-length, as more plainly shown in Fig. 8, so that the increase in the speed, instead of being a sudden one, thereby causing the bucket to kick and partially empty itself, will be very gradual, if not an absolutely uniform one.

From the above description the operation of the excavator will be readily understood, and from a consideration of the essential features of the machine it will be observed that our object has been to produce an excavator capable of performing a variety of operations and having advantages which are at present possessed only to a partial extent by machines of this class now in use.

In the well-known Dunbar and Burton or Osgood excavator two men are required to attend to the working of the machine, while in the machine herein described the manipulating devices are so arranged as to require but one attendant.

The above-named and other similar machines require a minimum width of thirty to forty feet, precluding the possibility of digging a narrow trench.

Our improved machine is capable of operation in a minimum width of fourteen to fifteen feet at rail-level; also, it is capable of being rotated through a larger arc (namely, an arc of one hundred and eighty degrees) than similar machines heretofore in use, and, moreover, owing to the use of a pivoted bucket-trough support and the necessary means for adjusting the same, the range of width is greater than in those machines of equal size, and it is also capable of taking off and completing the upper part of slopes much flatter than is at present possible, and which is now effected by supplementary manual labor.

Another advantage attained by our invention is that the motor works continuously, merely driving idle-gear, which can be connected separately or in any desired combination with the mechanism that drives the various operating parts, and the special arrangement of friction-clutches obviates or lessens very materially the wear and tear and liability of the various parts of the machine to fracture.

The described arrangements for discharging the spoils are also more convenient than those hitherto adopted either for bucket or shovel excavators.

The mechanism for advancing the whole machine as the work progresses and the holding of it up to the working-face permits of the use of a lighter machine than is now the case for a given class of work—that is to say, one of our machines of equal size is capable of heavier and more rapid work.

The provision of means for carrying the track-rails on the truck of the machine is also an advantage, in that a separate conveyance may be dispensed with and a saving of time effected when the track is to be extended.

Finally, the machine as constructed and mounted on its truck may be more readily dismounted and in less time than any other like machine within our knowledge.

Having described our invention, what we claim is—

1. In an excavator, a wheeled truck, a discharge-chute provided with ducts extending in opposite directions, and a support for said chute rigidly secured to the truck, in combination with a frame pivotally connected with the truck and chute-support, an endless propeller, excavating-buckets connected therewith, and a receiving-hopper into which the buckets empty, extending into the receiving end of the chute, said propeller, excavating-buckets, and receiving-hopper being supported from the pivoted frame, and a driving mechanism for the endless propeller mounted on said frame, substantially as and for the purposes specified.

2. In an excavating-machine, a wheeled truck, a discharge-chute provided with ducts extending in opposite directions, a distributing-valve arranged at or near the point of junction of the ducts and operating to direct the spoils into one or the other or both ducts, and a support for said chute rigidly connected with the truck, in combination with a frame pivotally connected with said truck and chute-support, an endless propeller, excavating-buckets connected therewith, and a receiving-hopper into which the buckets empty, extending into the receiving end of the chute above the distributing-valve, said parts being connected with and supported from the pivoted frame, and a driving mechanism for the endless propeller mounted on said frame, substantially as and for the purposes specified.

3. In an excavating-machine, the combination, substantially as described, with excavating devices and a wheeled truck on which said devices are mounted, of a chute for receiving and discharging the spoils, also mounted on said truck, said chute being provided with hinged diverging ducts, said ducts being provided each with a pivoted gate at the discharge end thereof, and a weighted lever secured to the pivot of the gate to hold the same open or closed, for the purposes specified.

4. In an excavating-machine, the combination, substantially as described, of a wheeled truck, a frame pivotally connected therewith, an endless-chain propeller, excavating-buckets connected therewith, a support for said propeller, tumblers mounted at opposite ends of said support, over which the endless propeller travels, a connection between the upper end of the propeller-support and the frame, bearings formed in said connection for the upper tumbler-shaft, and a driving mechanism for the propeller, consisting of a driving-shaft, a chain-wheel loosely mounted thereon and connected with a like wheel on the shaft of the upper tumbler, and a locking mechanism—such as a friction-clutch—for locking the chain-wheel to the shaft, a prime motor-shaft and a transmitting-shaft geared together and revolving in one direction only, bearings for said shafts secured to the truck, and a vertical driving-shaft geared with the transmitting and driven shafts, for the purposes specified.

5. In an excavator, the combination, substantially as described, of a wheeled truck, a frame pivotally connected therewith, an endless-chain propeller, excavating-buckets secured thereto, a bucket-trough, tumblers at each end of the trough over which the endless-chain propeller travels, and a support for said trough, consisting of a lever E, provided with bearings for the upper tumbler-shaft, a pivot mounted on the frame upon which said lever is fulcrumed, and an adjusting mechanism for adjusting the bucket-trough, consisting of a nut in the arm $e$ of lever E and a screw-threaded shaft mounted on the frame and working in said nut, for the purposes specified.

6. The combination, substantially as described, with the lever E, its nut N', and the screw-threaded adjusting-shaft 16, of shaft 5, geared to shaft 16, a driven shaft geared to shaft 5, a vertical driving-shaft geared to the driven shaft, a transmitting-shaft geared to the vertical driving-shaft, and a prime motor-shaft geared to the transmitting-shaft, for the purposes specified.

7. The combination, substantially as described, with the lever E, its nut N', and the screw-threaded adjusting-shaft 16, of shaft 5, geared to shaft 16, carrying two loose gear-wheels $5^a$ and $5^b$, friction-clutches operating to lock either wheel to the shaft, a driven shaft with gearing adapted to revolve in reverse directions and carrying a loose and fast pinion in gear with the loose pinions on shaft 5, a vertical driving-shaft geared to the driven shaft, a transmitting-shaft geared to the vertical shaft, and a prime motor-shaft, which latter, together with the transmitting-shaft and vertical driving-shaft, revolves in one direction only, for the purposes specified.

8. The combination, substantially as described, with a wheeled truck, the main frame F F', revoluble thereon, excavating devices consisting of an excavator-frame pivotally connected with a lever or yoke fulcrumed on the main frame, tumblers mounted at opposite ends of the excavator-frame, endless chains mounted on said tumblers, and excavating-buckets connected with the endless chains, of a hoisting mechanism consisting of a jib pivoted on the main frame, a hoisting-shaft carrying a hoisting-drum mounted in said main frame, and a hoisting-rope connecting the lower end of the excavator-frame with the hoisting-drum through said jib, substantially as and for the purpose specified.

9. The combination, with the bucket-trough

D and its supporting-lever E and frame F F', of means for supporting and adjusting the lower end of the trough, consisting of a jib composed of two arms J J$^a$, pivoted at their lower end to the frame, said arms carrying pulleys 9, 10, 11, and 12 and 9$^a$, 10$^a$, 11$^a$, and 12$^a$, respectively, the pulleys 13 and 13$^a$, secured to opposite sides of the trough D, the pulleys 14 14$^a$, secured to the upper side of said trough, a hoisting-shaft, carrying two drums, and a single hoisting-rope having its ends secured to the two drums and running over the pulleys, as described, and for the purposes specified.

10. In an excavating-machine, the combination of a prime motor-shaft, a transmitting-shaft, and a driving-shaft revolving in one direction only with a driven shaft, also revolving in one direction only and carrying wheels 2$^a$ and 2, in gear with a wheel on said driving-shaft, a hoisting-shaft geared with the driven shaft, and a reversing mechanism for reversing the motion of the hoisting-shaft, substantially as and for the purpose specified.

11. In an excavating-machine, the combination, with a wheeled truck, the race T', secured thereto and having internal gear-teeth, and a wheeled frame adapted to revolve on said race, of mechanism for revolving the frame, consisting of a vertical shaft carrying a pinion in gear with the race, a cross-shaft in gear with the vertical shaft, a driven shaft carrying the wheels 22 and 22$^a$, in gear with corresponding wheels on the cross-shaft, a driving-shaft carrying a wheel in gear with wheels 2 and 2$^a$, both driven and driving shafts revolving in one direction only, and a reversing-gear for reversing the motion of the cross-shaft, substantially as and for the purpose specified.

12. In an excavating-machine, the combination, with a wheeled truck, a wheeled frame pivotally mounted thereon, excavating devices consisting of traveling buckets and a support therefor, a lever fulcrumed to the frame and pivotally connected with the upper end of said support, an adjusting-shaft 16, for adjusting the lever, a jib pivotally connected with the wheeled frame, tackle connected with the jib and lower end of the support for the excavating devices, and mechanism for revolving the frame on its pivot, consisting of a race on the truck provided with an internal gear, a vertical shaft 27, in gear with the race, and a cross-shaft in gear with the vertical shaft, of a shaft 5, in gear with the adjusting-shaft 16, a hoisting-shaft 4, carrying hoisting-drums, to which is connected the tackle-rope from which the lower end of the support for the excavating devices is suspended, a shaft 6, in gear with shaft 27, a driven shaft with gearing adapted to revolve in either direction and in gear with shafts 4, 5, and 6, a vertical driving-shaft around which the wheeled frame is adapted to revolve, said shaft revolving in one direction only, and a reversing mechanism for each of said shafts 4, 5, and 6, substantially as and for the purposes specified.

13. In an excavator, the combination, substantially as described, with a truck, the excavator-frame mounted thereon, the operating-shafts 4, 5, and 6, each carrying two loose pinions, a single driving-shaft for said shafts 4, 5, and 6, and clutch mechanism for each of said shafts 4, 5, and 6, adapted to lock either of their loose pinions thereto, of actuating-levers for each of said clutches and intermediate connections, said levers being located on one and the same side of the frame in proximity to one another, for the purposes specified.

14. In an excavator, the combination, substantially as described, with the truck, the excavator mounted thereon, the transmitting-shaft S, and the haulage-drum shaft S$^4$, of a clutch mechanism for throwing the latter shaft into and out of gear with the transmission-shaft, a foot-lever pivoted in the excavator-frame, and intermediate connections between the clutch mechanism and foot-lever for operating said mechanism, for the purposes specified.

15. In an excavator, the combination, substantially as described, with the hoisting-shaft and the driving-shaft 3, of a brake consisting of a brake-shaft in gear with shaft 4, a brake-pulley 20, and a weighted lever connected by toggles or links to the ends of the brake-strap, for the purposes specified.

16. In an excavator, the combination, substantially as described, with an excavator-frame, the shafts 4, 5, and 6, the brake for shaft 4, the shaft S$^4$, and friction-clutches on said shafts 4, 5, 6, and S$^4$, of clutch-levers therefor, a brake-lever for the brake, and manipulating-levers and intermediate connections between said levers and the clutch and brake-levers, said manipulating-levers being all arranged on one and the same side of the excavator-frame in proximity to one another, for the purposes specified.

17. In an excavator, an endless-chain propeller and excavating-buckets connected therewith, said buckets being provided with a lip $d^2$ at the mouth thereof, in combination with the bucket-trough D, provided with bearings at opposite ends, and tumblers mounted in said bearings, said trough having its bottom arranged in the peripheral plane of the tumblers and extending from one tumbler to the other, substantially as and for the purposes specified.

18. In an excavator, the combination, substantially as described, of the driving-shaft 3, carrying a chain-pulley M, and the chain-pulley 49$^b$ for the endless-chain propeller K K', of two intermediate pulleys $m'$ $m^2$, loosely mounted on the same shaft and locked together by shearing-bolts, one of said pulleys being connected by chains with pulley 49$^b$ and the other with the pulley M, as described.

19. A means for taking up the slack in the endless propeller-chain, consisting in the combination, with the shaft of the lower tumbler, of sliding bearings, screw-shafts connected therewith, interiorly-threaded gear-wheels mounted on said shafts, and abutments for holding the gear-wheels against endwise motion on the screw-shafts, with a cross-shaft geared to the wheels on the screw-shafts, substantially as and for the purposes specified.

20. In an excavator, the combination, substantially as described, of a wheeled truck, a race T', secured thereto, a vertical journal projecting from the truck axially through the said race, standards s, secured to said truck, united at their upper ends, and having at that point a depending journal, with the truck constructed with bearings for the reception of the race and standard journals, respectively, for the purposes specified.

In testimony whereof we have signed our names to this specification in the presence of two subscribing witnesses.

H O. BALDRY.
J. T. PULLON.

Witnesses to the signature of Henry Osborne Baldry:
WM. THOS. MARSHALL,
E. FORREST.

Witnesses to the signature of Joseph Thomas Pullon:
J. CLARK JEFFERSON,
I. BOOTH JEFFERSON.